May 26, 1953     W. F. MITCHELL     2,639,884
FLUID VALVE
Original Filed April 28, 1948
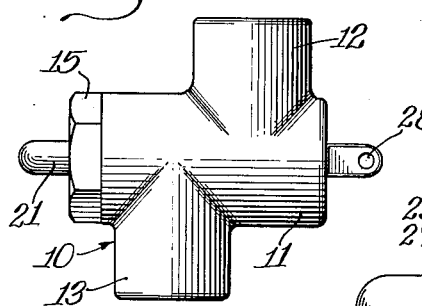
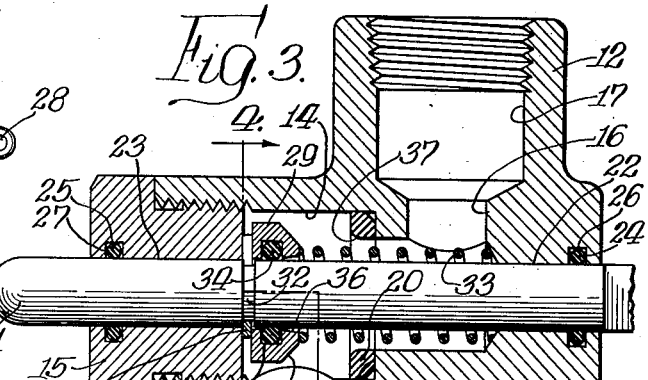
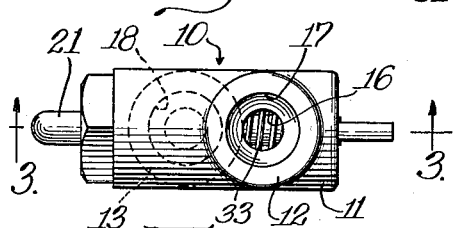
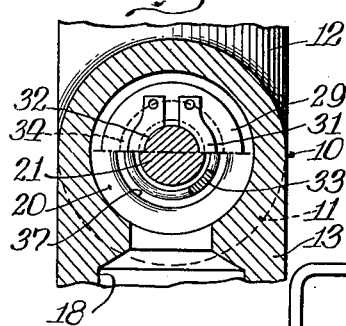
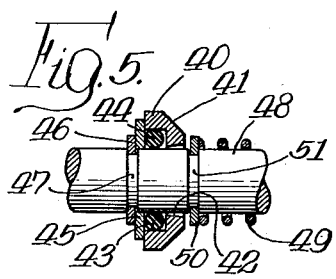
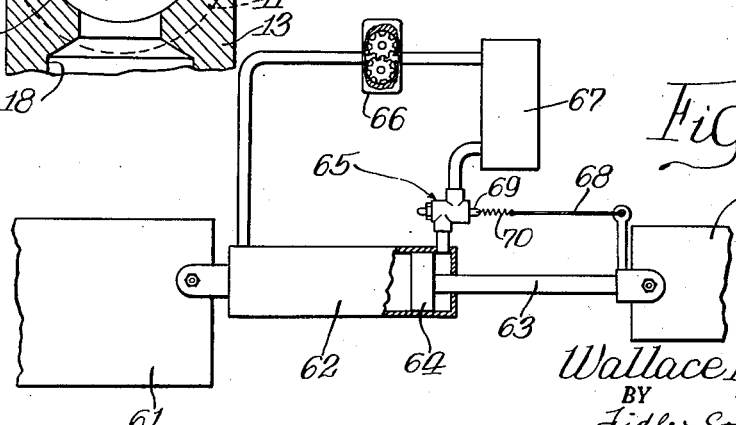
INVENTOR.
Wallace F. Mitchell,
BY
Fidler, Crouse & Beardsley
Attys.

Patented May 26, 1953

2,639,884

UNITED STATES PATENT OFFICE 2,639,884

FLUID VALVE

Wallace F. Mitchell, Chicago, Ill., assignor to M B G Corporation, Chicago, Ill., a corporation of Illinois Substituted for abandoned application Serial No. 23,709, April 28, 1948. This application May 1, 1951, Serial No. 223,886

3 Claims. (Cl. 251—137)

This application is a substitute for my abandoned application Serial No. 23,709, filed April 28, 1948, for Fluid Valve.

My invention relates to fluid valves and has to do particularly with a new and improved valve which is simple in construction and easy to manufacture and which has improved operating characteristics.

An object of my invention is to provide a valve wherein the operation of the valve is independent of any difference which may exist between the fluid pressure within the valve and the atmospheric pressure.

Another object is to provide a fluid valve in which the valve head does not creep out of a set position by reason of any difference in pressure which may exist between the fluid in the valve and the atmosphere.

Another object is to provide a valve wherein the atmospheric pressure on the valve stem is fully balanced.

Still another object is to provide a fluid valve wherein the only force required to actuate the valve is that which is necessary to overcome any difference in fluid pressures on the two sides of the valve head, the valve spring resistance, or friction.

A further object is to provide a valve in which the valve head is self-aligning and fully seats in the valve seat when in closed position even where inaccuracies of fit or alignment of the parts may exist.

Still a further object is to provide a valve which is simple and inexpensive to manufacture and assemble and which will operate satisfactorily without requiring close manufacturing tolerances.

Another object is to provide a valve which is not readily subject to binding or sticking.

Another object is to provide a valve which can be readily disassembled for replacement or adjustment of parts should such become necessary, as for example, in the case of damage due to abuse or wear due to a long period of usage.

Other objects and advantages of my invention will appear from the following description taken in connection with the appended drawing, wherein:

Figure 1 is a side elevational view of one form of valve embodying my invention;

Fig. 2 is a top plan view of the valve of Fig. 1;

Fig. 3 is an enlarged view of a vertical section taken along line 3—3 of Fig. 2;

Fig. 4 is a fragmentary view of a cross section taken along line 4—4 of Fig. 3;

Fig. 5 is a fragmentary view partially in cross section showing a modified form of valve head and the manner of mounting it on the valve stem; and Fig. 6 is a diagrammatic view illustrating one application of the valve in a hydraulic system.

I have found that where a valve of the type having a stem extending out of the valve housing and exposed to atmospheric pressure at only one end thereof is used for opening and closing a conduit containing a fluid under substantially greater than atmospheric pressure, the valve stem and head carried thereby are subject to creeping or drifting toward a position wherein there is a maximum volume of the valve stem protruding from the valve housing. This creeping results from the force exerted on the valve head and stem by the fluid pressures in the valve housing tending to expel the stem from the housing and into atmospheric pressures which are lower than the fluid pressures within the housing. While this creeping may be prevented by providing holding means for the valve stem, or by increasing the strength of the valve spring (where one is employed), such expedients are not satisfactory in many instances as the first renders the valve and its actuating mechanism unduly complicated and the second requires increased actuating force.

The present invention provides for balancing the atmospheric pressure which is exerted on the valve stem whereby the positioning and movement of the latter are entirely independent of any difference which may exist between the pressure of the fluid in the valve housing and the atmosphere. To this end, the valve stem is extended through the valve casing on both sides of the valve head and each of the projecting portions of the stem are formed with equal diameters so that atmospheric pressure is exerted equally on both ends of the valve stem. Thus, any difference between the fluid pressure within the valve casing and the pressure of the atmosphere is ineffective to move the valve stem in either direction.

Referring now particularly to Fig. 3 of the drawing, the valve includes a housing which may take any one of a number of suitable forms depending upon the utilization of the valve. The housing may be of any suitable material and preferably one which is suitably resistant to the fluid with which the valve is to be used and one which can be readily machined. The housing includes a housing member or valve body 10 which preferably takes the form of a generally cylindrical main body portion 11 with lateral extensions 12 and 13 which may be threaded to receive conduit members or fittings therefor. A valve chamber 14 is formed, as by a bore, in the main body portion 11 and is open at one end. The open end of the valve chamber is closed by an end fitting or plug 15 which is threaded into the main body portion 11 and forms a portion of the housing. The plug is readily removable to provide convenient access to the interior of the housing and is formed with a hexagonal head to permit it to be screwed down tightly.

Leading from the valve chamber 14 at the end thereof opposite the open end is a right-angled passage 16 having a portion in alignment with the chamber 14 and a portion leading to a passage 17 in the extension 12. A second passage 18 leads laterally from the chamber and through the extension 13.

The valve chamber 14 is of greater diameter than the passage 16 leading therefrom, thereby providing a shoulder 19 of annular form which may serve as a valve seat. However, the valve seat preferably is formed by a separate insert which takes the form of a ring 20 and which is snugly seated in the chamber 14 and against the shoulder 19. While the valve seat ring 20 may be formed of metal, I prefer to form it of a plastic material having sufficient strength and rigidity and sufficient resistance to the fluid with which the valve is used. I prefer to use nylon, although for certain uses a synthetic resin such as the copolymerized vinyl chloride and vinyl acetate sold under the trade name of "Vinylite" is also satisfactory. Synthetic plastics of the types mentioned are generally more satisfactory than metal since they are not subject to sticking under relatively high fluid pressures as is often found to be the case with metal valve seats when used with metal valve heads.

A valve stem 21 is slidably mounted in the housing 11, suitable openings 22 and 23 being provided respectively in the body portion 11 and the end fitting 15 to receive the stem, the latter being projected entirely through these openings and exposed to the atmosphere. Suitable fluid seals are provided between the stem and the housing which preferably take the form of O rings 24 and 25 seated in annular recesses 26 and 27 in the openings 22 and 23. The sealing rings 24 and 25 may be formed of any suitable resilient material which is resistant to wear and to the fluid with which the valve is used and which will retain its resilience over a long period of use. I have found that various synthetic rubbers are suitable for this purpose. The stem may be provided with an eye 28 for attachment of suitable actuating means, if desired.

A valve head 29 is carried on the valve stem 21 and is movable thereby into position against the seat 20 for closing the passage through the seat. The head preferably is formed as a ring having a conical face 30 adapted to abut the ring 20 with the forward portion of the valve head extending into the opening in the ring. The valve head 29 may be rigidly mounted on the valve stem 21 and may be formed integrally therewith, or may be formed separately and secured to the stem. However, for reasons which will appear hereinafter, the head 29 preferably is separately formed and is seated against a shoulder which preferably is provided by a split snap ring 31 seated in a circumferential groove 32 formed in the valve stem 21, thus providing a rigid abutment for preventing displacement of the valve head on the stem 21 in one direction. A valve spring 33 is provided which bears at one end against the valve body 10 and at the other end against the head 29. The spring 33 thus serves both to urge the valve stem and head toward open position and to maintain the head yieldingly against the snap ring 31. A fluid seal is provided between the valve head 29 and the stem 21 which preferably takes the form of an O ring 34 surrounding the stem 21 and seated in a circumferential recess 35 in the valve head 29. The valve stem, head and spring are formed from a suitable material or materials and preferably steel is used for this purpose.

It has been noted that in conventional types of poppet valves where the head is integral with, or at least rigidly fixed to the valve stem, the head may not fully seat in the valve seat, as may happen when the parts are not accurately aligned or where wear has taken place. In accordance with the present invention, the valve head is made self-adjusting and self-aligning so that even should the parts be slightly out of alignment, the head will fully seat when moved to closed position. Accordingly, the valve head is mounted on the valve stem 21 for sufficient universal rocking movement thereon so that when the valve head is moved into position against the seat 20, it will align itself with the valve seat and fully seat to close the opening through the seat 20 even though the several parts of the valve may be slightly out of alignment. To provide this movability of the head, the circular surface 36 surrounding the opening through the valve head is formed convexly on a radius to permit a slight rocking movement of the head relative to the valve stem. Thus, it will be seen that when the valve stem and head are moved into seated position, the head will rock about the convex surface, if necessary, in order to contact the seat 20 throughout a continuous circular area of contact. It will be understood that the self-aligning action of the valve will take place even though the valve ring may be of very rigid material and rigidly mounted. In order to provide smooth seating of the valve head, I preferably round off the edge 37 of the seat ring 20 although this is not necessary in all cases.

Various modifications in the details of construction may be made in the valve of my invention without departing from the invention. For example, the valve head and stem may take the form shown in Fig. 5, to which reference now is made. The valve head 40 is provided with an inclined conical surface 41 and an opening 42 having a somewhat convex face in a manner generally similar to the valve head 29. However, instead of providing a circumferential groove in the head for the receipt of the sealing ring, a recessed opening 43 may be provided which is open at one side to admit a sealing ring 44. The sealing ring 44 is retained in the open-ended recess by a thrust washer 45 which is adapted to bear against a snap ring 46 secured in a circumferential groove 47 in the valve stem 48. The valve spring 49 may bear directly against the valve head 40 in the manner shown in Fig. 3 and described above, or it may bear against a split snap ring 50 seated in a circumferential groove 51. Where the latter construction is employed, the snap ring 50 is of such diameter as to enter the opening in the valve seat and permit the inclined face of the valve head to seat against the valve seat. In this construction, it will be seen that the valve head is entirely free to rock and is independent of any unbalanced force which might be exerted by the spring and tend to resist free rocking movement of the head 40. It will be understood that the valve head shown in Fig. 3 may be mounted in a similar manner for rocking movement entirely freely and independently of the spring 33 by the employment of a second snap ring in a manner similar to that shown in Fig. 5.

It should be understood from the foregoing that the valve of the present invention lends itself to a wide variety of applications where it is desired to obtain the advantages of this novel type of valve. In order to more fully illustrate the valve of the present invention, it is shown in Fig. 6 in connection with its use as a stroke-limiting valve, although it will be understood that the valve is in no way limited to such use. As will be understood, in certain types of devices, a hydraulic system is employed for controlling the position of a movable member and a stroke-limiting valve is incorporated in the hydraulic system in order to close the system and prevent further actuation of the driven member when it reaches a predetermined extreme position.

Referring now particularly to Fig. 6, there is illustrated diagrammatically a very simple form of hydraulic system embodying a valve 65 constructed in accordance with the present invention for raising and lowering a working member such as a plow 60 carried on a plow frame 61. The plow 60 is connected to the frame 61 through a cylinder 62 and a piston rod 63 carrying a piston 64 slidable in the cylinder 62. Connected to the cylinder on opposite sides of the piston is a hydraulic line having therein a stroke-limiting valve 65 constructed in accordance with the present invention, a pump 66 and a reservoir 67. Suitable control means (not shown) are provided for actuating the pump 66 in either a forward or reverse direction to cause the piston to move either to the left (as viewed in Fig. 6) to raise the plow 60, or to the right (as viewed in Fig. 6) to lower the plow 60. The plow is connected by a chain or cable 68 to the stem 69 of the valve 65 through a spring 70.

When the plow is in raised position, the piston 64 is at the left hand end of its stroke and the cable 68 is slack permitting the valve to be urged into fully open position by the valve spring. When it is desired to lower the plow 60, the pump 66 is driven in a suitable direction to pump the hydraulic fluid through the system in a counter-clockwise direction (as viewed in Fig. 6) to cause the piston 64 to move to the right. When the plow 60 has reached the desired limit of its travel (as shown in Fig. 6), the cable 68 is drawn taut and moves the valve stem 69 to close the valve, thereby preventing further circulation of the hydraulic fluid. When it is desired to raise the plow, the pump is operated in a reverse direction to cause the piston to move to the left in its cylinder and, upon the initiation of such movement, the tension on cable 68 is released permitting the valve to be opened, whereby the fluid may be circulated freely through the system by the pump 66 to raise the plow 60. When the piston reaches the end of its travel, the pump is stopped by the operator.

From the foregoing, it will be seen that the present invention provides a valve having numerous advantages and which is suitable for application to a wide number of uses. The valve has a relatively small number of relatively simple parts which may be readily manufactured and assembled. Only a relatively small number of simple machine operations are required in making the parts. Moreover, the construction of the valve is such that it will operate satisfactorily for many uses without the need for making it with a high degree of accuracy and exact fit of the parts.

The valve stem extends through the valve housing and projects therefrom at both ends whereby it is exposed to atmospheric pressure at both ends. Accordingly, the valve stem and head carried thereby are fully balanced and hence will not exhibit any tendency to drift or creep even when relatively high fluid pressures exist in the valve housing. Moreover, since the valve is balanced with respect to the atmosphere, the operation of the valve is independent of any difference in pressure between the fluid within the housing and the atmosphere. Thus, the only force which is necessary to operate the valve is the force necessary to overcome any pressure differential which may exist between the fluid on the two sides of the valve seat, the resistance of the valve spring, or friction.

Since the valve head is mounted for self-aligning movement on the stem, hence, even if the parts should happen to be out of alignment by reason of manufacturing inaccuracies or because of uneven wear, the valve would still function. The valve stem is fully and effectively sealed to prevent loss of fluid from the housing and the simple but sturdy mounting for the valve stem minimizes the likelihood of binding of the stem in the housing. In addition, the use of a synthetic resin valve seat ring prevents sticking of the valve against the seat as might otherwise occur were a metal valve seat employed, especially where the valve is subjected to relatively high fluid pressure.

I claim:

1. A fluid valve comprising a valve housing having a fluid passage therethrough, a circular valve seat in said housing and surrounding said passage, a valve stem slidably mounted in said housing and extending through said passage, a valve head on said stem with the stem extending through the valve head for movement of the valve head thereby into and out of seated position against said seat, said valve head including a ring having a tapered surface engageable with said valve seat and an internal annular recess and a resilient sealing element in the recess surrounding the valve stem in sealing engagement therewith, the inner surface of said ring being of greater diameter than the valve stem for permitting rocking movement of the ring on the valve stem, rigid stop means fixed on said valve stem on the other side of the valve head than the valve seat, and yieldable means urging the valve stem and valve head to open position.

2. A fluid valve comprising a valve housing having a fluid passage therethrough, a circular valve seat in said housing and surrounding said passage, a valve stem slidably mounted in said housing and extending through said passage, a valve head on said stem with the stem extending through the valve head for movement of the valve head thereby into and out of seated position against said seat, said valve head including a ring having a tapered surface engageable with said valve seat, an internal annular recess with axially spaced walls and a resilient sealing element in the recess surrounding the valve stem in sealing engagement therewith, the inner surface of said ring being of greater diameter than the valve stem for permitting rocking movement of the ring about the valve stem, rigid stop means fixed on said valve stem on the other side of the valve head than the valve seat, and a spring surrounding the valve stem compressed between the valve housing and valve head for urging the valve stem and valve head to open position.

3. A fluid valve comprising a valve housing having a fluid passage therethrough, a circular valve seat in said housing and surrounding said passage, a valve stem slidably mounted in said housing and extending through said passage, a valve head on said stem with the stem extending through the valve head for movement of the valve head thereby into and out of seated position against said seat, said valve head including a ring having a tapered surface engageable with said valve seat and an internal annular recess open at its rear end and defined at its forward end by a wall portion of the valve head and a resilient sealing element in the recess surrounding the valve stem in sealing engagement therewith, the inner surface of said ring being of greater diameter than the valve stem for permitting rocking movement of the ring on the valve stem, a rigid washer element closing the rear open end of said recess, rigid stop means fixed on said valve stem on the other side of the valve head than the valve seat, rigid stop means fixed on the valve stem forwardly of the valve head spaced from the rear stop means a distance sufficient to permit limited axial sliding movement of the valve head on the valve stem, and a spring surrounding the valve stem compressed between the valve housing and forward stop means for urging the valve stem and valve head to open position.

WALLACE F. MITCHELL.

References Cited in the file of this patent

UNITED STATES PATENTS

| Number | Name | Date |
|---|---|---|
| 1,111,391 | Kneass | Sept. 23, 1914 |
| 2,570,117 | Hallstrand | Oct. 2, 1951 |

FOREIGN PATENTS

| Number | Country | Date |
|---|---|---|
| 388,902 | Great Britain | of 1933 |